United States Patent [19]

Renelt et al.

[11] Patent Number: 5,040,073
[45] Date of Patent: Aug. 13, 1991

[54] METHOD OF TRANSMITTING PICTURES AND AN ARRANGEMENT FOR PERFORMING THE METHOD

[75] Inventors: Gerhard Renelt, Hamburg, Fed. Rep. of Germany; Raymond G. G. Schayes, Brussels, Belgium

[73] Assignee: U.S. Philips Corporation, New York, N.Y.

[21] Appl. No.: 378,884

[22] Filed: Jul. 12, 1989

[30] Foreign Application Priority Data

Jul. 13, 1988 [DE] Fed. Rep. of Germany ....... 3823674

[51] Int. Cl.⁵ .............................................. H04M 1/41
[52] U.S. Cl. .................................. 358/261.1; 358/426
[58] Field of Search ............... 358/261.1, 261.2, 261.3, 358/426

[56] References Cited

U.S. PATENT DOCUMENTS 4,679,094 2/1987 Rutherford et al. ............. 358/261.1

Primary Examiner—Edward L. Coles, Sr.
Attorney, Agent, or Firm—Michael E. Marion

[57] ABSTRACT

It is known in the transmission of facsimile pictures to transmit the black-white data represented by one binary position per picture element via a run length coding. For the transmission of pictures in which the individual picture elements are represented by binary words having a plurality of binary positions, the individual binary positions of all the binary words are now always subjected picture line-sequentially to a run length coding and are transmitted. When a hierarchic code is used for the representation of P.E. values a compatability with the conventional facsimile receivers is simultaneously provided, which then processes only the most significant binary positions. In addition, measures for the pre-processing of the scanning values are described, so as to obtain a smoothed sequence which can more effectively be transmitted by means of run length coding.

31 Claims, 2 Drawing Sheets

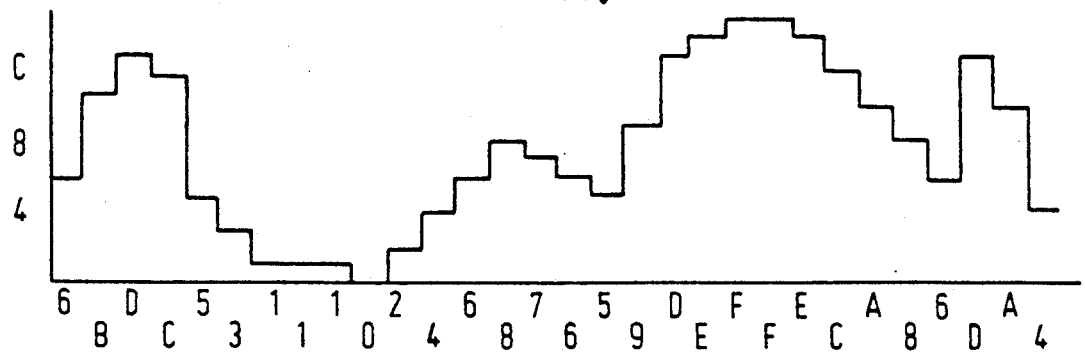

FIG. 2a.)
FIG. 2b.)
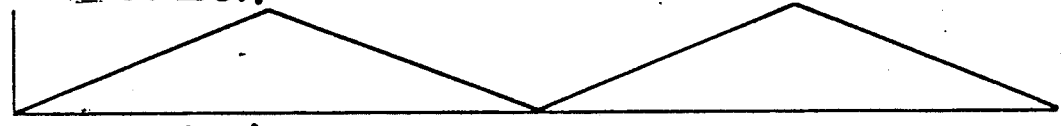
FIG. 2c.)
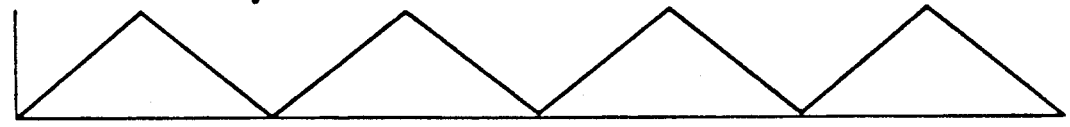
FIG. 2d.)
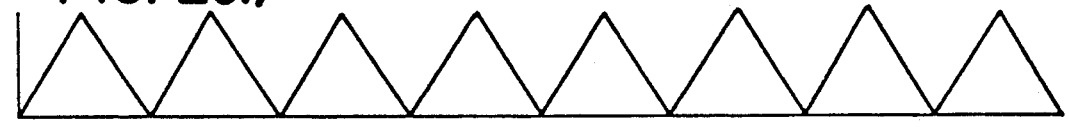
FIG. 2e.)
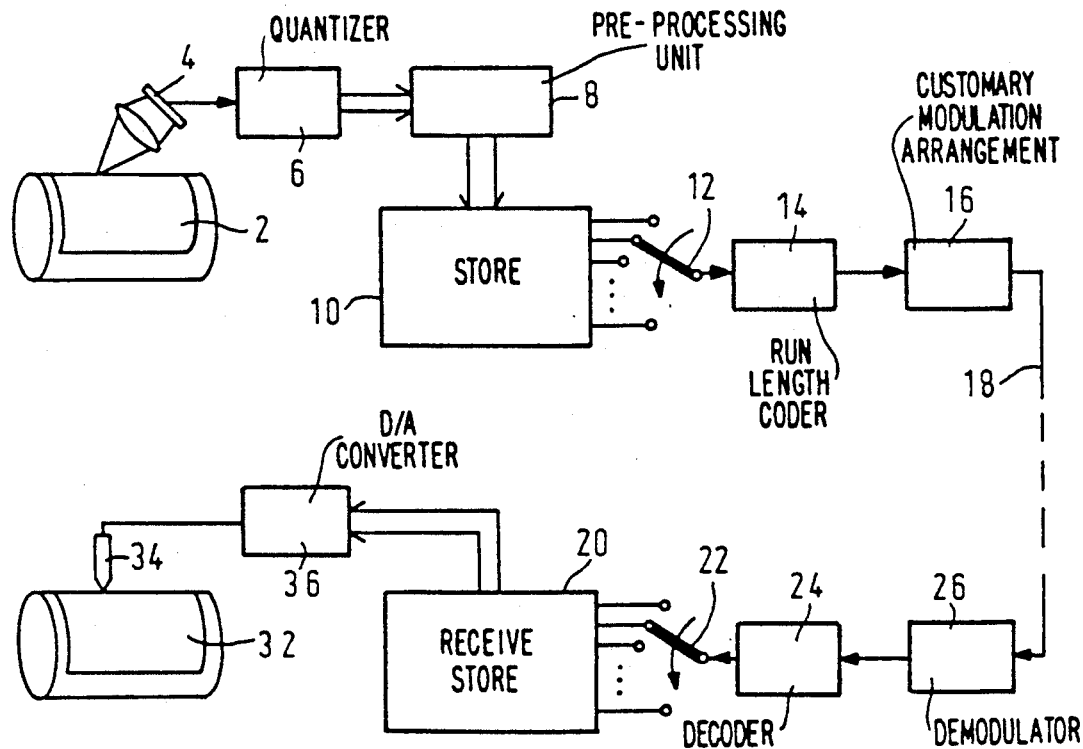
FIG. 3

METHOD OF TRANSMITTING PICTURES AND AN ARRANGEMENT FOR PERFORMING THE METHOD

BACKGROUND OF THE INVENTION

The invention relates to a method of transmitting pictures by linewise scanning of the picture elements, the value of the scanning picture elements being quantized and represented as binary words which are converted into code words by means of a run length code, and also to arrangements for putting this method into effect.

The use of such a method for the transmission of facsimile pictures is disclosed in, for example, the DE-PS No. 23 61 234. In this prior art method the black/white values of the picture elments themselves are not transmitted, but the numbers or lengths of runs, of consecutive white picture elements an consecutive black picture elements respectively. The transmission by means of such so-called out-dimensional run length coding, results in a data reduction of on an average a factor of 10. However, the prior art methods are based on a black/white picture elements.

It is an object of the invention, also for the transmission of images which have a plurality of grey levels and/or colours, to provide a method of the type defined in the opening paragraph, with which a correspondingly simple and redundancy decreasing encoding is possible.

SUMMARY OF THE INVENTION

According to the invention, this object is achieved in that for the transmission of pictures, the scanning values of the picture elements of which are represented as binary words having a plurality of binary positions, the bit values of bits of equal significance of a group of values of picture elements are separately converted with the aid of a run length code and are transmitted, so that fore each group of picture elements the number of coded runs is equal to the number of bits of the binary words which runs length code after decoding provide the bits of a particular significance of the binary words of all the picture elements of a group.

A group of picture elements may comprise a part of, or a complete picture line, or parts of a number of adjacent picture lines.

Thus, the known method of run length coding is consequently used for bits equal significance of the binary words of a group of, for example, picture lines. The prior art circuits and arrangements can basically be used. As in many images adjacent picture elements are vary similar, at least in individual areas, only few bits of equal significance of the corresponding binary words are different in adjacent picture element values, so that long runs are obtained for the majority of bits, which results in an effective redundancy reduction and consequently in an effective data reduction. This is even more significant, when in accordance with an embodiment of the invention the picture element, values are represented as binary words of an at least partially hierarchic binary code, in which the most significant bit indicates whether the picture element value is located in the upper or in the lower range of the value scale. This is accompanied by the particular advantage that in addition to a high data compression also the full compatability with pictures which are only encoded black/white is maintained. It is therefore possible that a transmitter for the transmission of half tone pictures or colour images also drives the receiver, which until now can only print black/white images. If, for example, a half tone picture is simultaneously transmitted to a plurality of receivers, a receiver of a corresponding structure can represent the exact half tone picture, another receiver which is exclusively constructed for the representation of black/white images processes only the most significant bits and ignores all the subsequent binary positions. A similar situation also holds for color images. During the transmission between two sets, the receiver can inform the transmitter during setting up of the connection about the limited reproduction possibilities, so that the user may only encode and/or transmit the corresponding binary positions. This may save transmission time.

Further embodiments of the method according to the invention are characterized in the further sub-claims.

An arrangement for putting the method of the invention into effect, having at the transmitter end a coding device for converting bits of equal values and equal significance in binary words of consecutive picture element values into code words in accordance with a run length code, a transmission path for bit-sequentially transmitting the code words to the receiver and a decoder arranged at the receiver end for decoding the received code words and for generating binary words in accordance with a picture to be reproduced, is characterized in, that at the transmitter end a transmitter store is provided for the consecutive recording of the binary words generated from the picture element values of at least one picture line, and a transmitter control arrangement is provided for consecutively reading at least one binary position of all the binary words of a group and for applying the bit values of the binary positions to the encoder. At the receiver end a receiver store and a receiver control arrangement are provided. The receiver control arrangement enters the bit sequences supplied by the decoder into the receiver store in the corresponding bit positions of the receiver store and after reception of all the transmitted information of a group sequentially reads the bit positions associated with a binary word. Since at the transmitter end the individual binary words occur in the bit-parallel mode, encoding and transmitting of the individual bit positions cannot start until a group, for example a line, has completely been scanned. This holds at least for the second and the subsequent bit positions. Therefore a buffer store must be present at both the transmitter and at the receiver end which in the manner described stores the bit words in parallel at the transmitter end and serially releases the individual positions and at the receiver end effects the inverse procedure. As compared with conventional devices, only the store is required in addition to a finer resolution of the scanning operation at the transmitter end . A corresponding outputting device at the receiver end, is also required while the encoder and the decoder can basically be of a customary structure.

A further arrangement of the same type for effecting the method according to the invention, is characterized in that at the transmitter end the encoder converts in parallel for each bit position each of the binary words produced from the picture element values into a sequence of code words and stores them in a transmitter store. A that a transmitter control arrangement is provided which sequentially reads from the transmitter store a sequence of code words of a group and applies them to the transmission path. At the receiver end a receiver control is provided, the receiver control sequentially storing the received sequences of code words of a group in the receiver store and reading them sequentially and in parallel from this store and applying them to the decoder which produces in the parallel mode the bit values of the individual bit positions of the binary words of a picture line. This structure is advantageous when a transmission path having a plurality of parallel, optionally time-interleaved channels is available.

BRIEF DESCRIPTION OF THE DRAWINGS

Embodiments of the invention will now be described in greater detail by way of example with reference to the accompanying drawings. Therein:

FIG. 1a–1d show an example of a scanned line and also the code words assigned to the picture element values and the run length of the individually bit positions, FIG. 2a–2e show different linearly increasing and decreasing grey values within a line, FIG. 3 is a schematic block circuit diagram of an arrangement for the encoding, transmission and decoding of picture signals.

DETAILED DESCRIPTION OF THE INVENTION

FIG. 1 shows by way of example the variation of the grey levels throughout a picture line of a half tone picture. The grey values represntation. themselves are indicated at the bottom in a hexadecimal A binary representation of the values by a hierarchic code when the hexadecimal values are represented as four-position binary numbers, as is shown in FIG. 1b were the values of the sequential binary positions of the binary words are shown one below the other. A more advantageous representation is however obtained when instead thereof a hierarchic code is used which, in the event the consecutive picture element values continuously change, always changes only in one binary position as is shown in FIG. 1c. An example of such a code is shown in the subsequent Table 1, which illustrates the assignment of the hexadecimal values to the four-position binary words.

TABLE 1

| 0: | 0000 | 4: | 0LL0 | 8: | LL00 | C: | L0L0 |
|----|------|----|------|----|------|----|------|
| 1: | 000L | 5: | 0LLL | 9: | LL0L | D: | L0LL |
| 2: | 00LL | 6: | 0L0L | A: | LLLL | E: | L00L |
| 3: | 00L0 | 7: | 0L00 | B: | LLL0 | F: | L000 |

From such a code having n binary positions a code having n+1 binary positions can be formed when the n binary positions are preceded by a most significant binary position and when the n-position of the code words of the Table 1 is once again repeated in the first sequence for the portion of the extended table in which the, represented binary positions have the other binary value. Conversely, a corresponding code with fewer binary positions can be obtained, as only those portions of the Table 1 are used in which the binary positions to be omitted are constant.

After scanning and conversion of the picture element values of a picture line a matrix is obtained which, consists of a number of columns equal to the number of picture elements per picture line and a number of lines equal to the number of binary positions of the binary words from binary elements, as is shown in FIG. 1b or 1c. Each of the matrix lines are individually subjected to a data reduction, as they are represented by a run length code.

The advantage of using a code formed in accordance with Table 1 for the represention of the different picture element values is in the fact that they allow a particularly good data compression while using a suitable run length code. The data reduction factors shown in Table 2 are obtained for linearly increasing and decreasing grey value distributions within a picture line. This is shown in the FIGS. 2a to 2e using the customary run length code, for example the modified Huffman code (MHC) or the run length code (EDC) which can be decoded in a simple way and is disclosed in the DE-OS No. 26 51 902 without taking account of any control signs.

TABLE 2

|         | MHC   | EDC   |
|---------|-------|-------|
| FIG. 2a | 19.98 | 27.32 |
| FIG. 2b | 11.78 | 17.11 |
| FIG. 2c | 8.07  | 10.33 |
| FIG. 2d | 5.01  | 6.18  |
| FIG. 2e | 3.26  | 3.88  |

These advantageous values are obtained when all the matrix lines are encoded with the same run length code, which however, is only optimally adapted for the first matrix line. A further improvement can be obtained by encoding and decoding the different matrix lines with different run length codes, for which purpose code classes in which by changing a parameter an adaptation to the instantaneous requirements are possible, without the cost and design efforts for coding and decoding increasing too much. An example thereof are the variants of EDC in which the increase in length $1-1_0$ of the suffix is used as the parameter.

On transmission, the encoded run length of the individual matrix lines are transmitted sequentially, starting with the most significant matrix line. In the setting up of the connection the number of matrix lines of each picture line (maximum number of binary positions for the representation of the picture element values) can be determined. At the receiver side, after decoding of the run length, the distribution into matrix lines and picture lines is again obtained unambiguously from the determined number of picture elements of each line, provided no transmission errors must be taken into account. Such error can however often not be prevented. To limit their effect, use is made in the cases of end-of-line characters which are coded in known manner and are added to the end of each matrix line or at least to the end of each picture line.

It is possible to add some identification bits which contain additional information for the relevant line, to these end-of-line characters. This enables more specifically an indication of the significance of the relevant matrix line. It is however alternatively possible that only the picture line belonging to the matrix line is characterized by a picture line number (for example modulo 4), and that the significance follows from the sequence of the consecutive matrix lines. In addition, it is possible to indicate the type of the relevant coding by corresponding identification bits in the case of different run length codes of the different matrix lines. In the case in which colour pictures are encoded, further corresponding identification bits are added as colour characteristics. This additional information is preferably placed immediately after the end-of-line character or immediately in front thereof, and the significance of the corresponding binary positions are determined not later than during the connection set-up. The latter also holds when in the case of safe transmission the end-of-line character can be omitted. The relevant identification bits are then inserted between the end of the line and the beginning of the next line.

By way of example the following identification field consisting of five binary positions will be examined for a picture half tone encoding:

$$K_1 K_2 K_3 K_4 K_5$$

Therein $K_1 K_2$ denotes the line number (significance) of the relevant matrix line, whereas $K_3 K_4$ denotes the number of the higher-value picture line modulo-4 and the bit $K_5$ denotes whether the run length coding which has been agreed upon as being the normal coding for the relevant matrix line or a variant was used. Such a variant can, for example, also be an encoded transmission of such a matrix line for a matrix line of a low significance at a very rapidly changing picture variation. The length of the identification field is mostly chosen to be constant, but may however also be determined in dependence on the content of a sub-field. In the above example it may be, for example, that the picture line number $K_3 K_4$ will always appear only in the first matrix line. In the coding method described so far half tone pictures were first used as the starting point. The method can however also be used for any quantizable picture and more particularly also for colour pictures. To that end, colour picture is decomposed in known manner into colour components and the quantized amplitude of each colour component is encoded in the manner described. The encoded lines are correspondingly characterized by a corresponding identification in the identification field. A decomposition of the colour signal in an equally known manner into a luminance and into chrominance components is however also of particular advantage, more specifically as regards the compatability with a black/white and a grey scale production. Also these components can be encoded in the method described after quantization. Optionally it is then also possible to reduce the information content and the cost of representation of the chrominance components by a lower number of matrix lines (fewer quantizing stages) and/or a lower spatial resolution (lower number of picture elements/line, for example by a factor of 2 or 4 with an correspondingly shorter coding and/or a determinating and storage of the chrominance components for only every $r^{th}$ picture line), so that the cost and design effort for the reproduction increases only moderately compared with the half-tone coding.

At the reproduction of the picture element values of the scanned picture by multi-position binary words, unwanted fluctuations of the quantized output signal can however occur much easier than at the purely black/white quantization. This then results in different binary words for consecutive picture elements, which may result in short run lengths in at least a few bit positions. This additionally causes a slight data reduction by the run length coding and consequently a long transmission time. Such small fluctuations can be caused by quite a large number of influences, such at dust particles or local fluctuations in the properties of the carrier of the scanned picture and the degree of blackness of the printer and the fine structure of the print and also in the case of a picture element-parallel scanning in differences in sensitivity of the individual photo cells.

A first possibility to reduce such random fluctuations in the scanning signal of consecutive picture elements is possible in that the area of the scanned picture elements is increased, i.e. a slight defocusing is used, so that at least in the edge regions overlap with the scan of adjacent picture elements occurs. The integration effected thereby compensates for fluctuations in the fine structure of the scanned picture.

A further possibility for compensating random fluctuations of the scanning signal which can be effected alone or in addtion to said increase of the scanned picture elements, consists in that the quantized scanned values of consecutive picture elements are compared with each other. As long as the differences stay below a predetermined threshold value, these scanning values are all kept at a constant value, for example at the mean value. If the quantizer first produces a dual representation of the scanning values, then this representation can be stored intermediately in the pre-processing unit and the formation of the difference can be effected in this representation in a known manner. It is however alternatively possible to effect the difference formation from the encoded form of the scanning values, such as it is already available in the store. If the threshold value is, for example, $\pm 1$, then with a code structure as shown in Table 1 the required and adequate condition is that these two scanning values are to differ accurately by one quantization step, that the associated code words are to differ only in one binary position and, should this not be the last position, the rest of the code word rest (of a low significance) is $LO^i$ ($i=1, 2, 3, \ldots$) (that is to say $L, L0, L00, L000, \ldots$). The higher scanning value is then given by the code word whose initial portion until and inclusive of the different position has an odd number of ones.

The smoothing operation described is particularly important for the efficient coding of areas of a constant scanning value, which would not be rational without the elimination of relevant fluctuations. More extensive forms of the pre-processing operations are of course possible. The required degree therefor then highly depends on the instantaneous requirements on the copy and the quantization steps necessary therefore and in particular also on the quality of the original document. In many cases it is already sufficient to omit the least significant position(s), which implies a combining of two or more quantization steps to greater units. Such a procedured has indeed the advantage that it is particularly simple, but compared with the measures described in the foregoing it fails in those cases in which small fluctuations around a constant scanning value, which are exactly located in the boarder region between two coarser quantizing steps, occur.

Sometimes it is also desirable to indicate the value of a constant scanning value more accurately, when it corresponds to the transmitted quantization accuracy. Such a quasi-intermediate value can be simulated by representing the otherwise constant range by the two adjacent quantized scanning values in a spatially statistic mixture. Only the lower scanning value and the ratio of mix, for example by indicating the picture elements for which this lower value should hold, and an indication of the picture elements for which the scanning value which is greater by one quantizing step should hold, are indicated for the transmission, it then of course being necessary to define the last-mentioned quantities by a special identification. On the basis of this information a statistic mixture of the two grey values is then effected at the receiver side, so that a pseudo-intermediate value is obtained therewith.

In a particular embodiment of the method, an additional matrix line per picture line or picture component line, respectively, is used for capturing small fluctuations. In the regular matrix lines, the storage of the scanning values is effected as described in the foregoing. However, as long as the scanned value of a picture element increases not more than one unit, compared with the regularly stored value of the preceding picture element, this fluctuation is only present in the additional line and the stored value in the regular matrix lines remains unchanged. Consequently, the run length in these lines are not shortened by these fluctuations and a more effective data compression is obtained. Transmitted are either only the run length of the regular matrix lines or, depending on the instantaneous requirements in addition to the additional lines the sum of all the one-values and the sum of all the zero values (static mixing ratio) or in the encoded, preferably however in the uncoded form, also the overall additional line. By using several of these additional lines also scanning value fluctuations which exceed one unit can be eliminated in this manner.

In the pre-processing measures described in the foregoing, only the scanning values of the adjacent picture elments within the same picture line are used for smooting. It is however, alternatively possible to use additionally the scanning values of the adjacent picture lines. It is then necessary to save all the values of the relevant picture lines in corresponding storage areas. If these storage areas are considered to be storage levels which can be superimposed on each other, the values of adjacent picture elements also become adjacent in the store. The decision whether occurring scanning value changes are relevant or not relevant can be still further qualified by incorporating these adjacent values.

Finally, taking adjacent picture lines into account also allows the generation of a new value field from the field of the quantized scanning values, by comparing the scanning values of the sequential line with the scanning values of the preceding line and coding only the non anticipated changes in the sequential line in accordance with the known principles of bidimensional run length coding. This further preprocessing operation provides a reduced value field to which the method described is also applicable and which results in a particularly compact reproduction of the scanned picture.

FIG. 3 shows a circuit diagram of an arrangement for effecting the method described. The picture to be scanned is placed on a carrier 2 which is in the form of a sheet and is here mounted on a rotating drum. The carrier 2 is scanned picture element-sequentially in consecutive picture lines by means of an optical scanning arrangement 4, and the analog scanning values are applied to a quantizer 6 which applies the digitized scanning values, which are reproduced in a hierarchic binary code in accordance with Table 1, to a pre-processing unit 8. This pre-processing unit performs at least some of the pre-processing steps described in the foregiong and the binary words thus obtained are applied to the store 10 and entered therein in the word-parallel mode in preferably consecutive storage locations. After scanning of a picture line the content of the store 10 has approximately the form shown in the respective FIGS. 1b and 1c, each column of the matrix shown there illustrating the bits of a binary word.

After a complete picture line has been scanned, the store 10 is read line-sequentially, for example by consecutively and repeatedly reading all the binary words and the contents of always a different binary position of all the binary words are applied by means of a change-over switch 12 to a run length coder 14. The run lengths of the lines such as they are shown, for example, in FIG. 1d, are applied to a receiver via a customary modulation arrangement 16 over the transmission path 18 which may alternatively include a store. So as to allow a continuous scan and transmission it is recommendable to design the store such, that it can simultaneously store the data of more than one picture line to uncouple writing and reading from the store 10. If a bidimensional coding must be used, a plurality of picture lines must be stored simultaneously in a corresponding manner. The store 10 may then be considered as being comprised of a plurality of levels, each level receiving the scanning values of a picture line in the shape shown in FIG. 1b and 1c, respectively. In addition it may be appropriate, for the purpose of decoupling run length encoding from transmission, to once again effect after the encoder 12 an intermediate storage in the linear form of the encoded data in a buffer store, not shown.

In accordance with a modification of the arrangement shown in FIG. 3, it is also possible to effect the run length coding for the dividual binary positions of the binary words in parallel and only then to effect the storage for the subsequent parallel-to-series conversion. In this situation, in the arrangement shown in FIG. 3, the positions of the encoder 14 which then consequently includes a number of separate run length encoders in store 10 must be interchanged.

At the receiver end the transmitted data are reconverted in a demodulator 26 into the encoded run length and applied to a decoder 24 which sequentially applies these data via a change-over switch 22 which operates in synchronism with the change-over switch 12 at the transmitter side to the individual binary positions in a receive store 20 which thus is filled line-sequentially until after transmission of the encoded run length of the last binary position of a picture line a content has been created in the store 20 which corresponds to the shape shown in the respective FIGS. 1b and 1c. Thereafter, the consecutive binary words are word-sequentially taken from the store 20 and applied to a digital-analog converter 36 which controls a write arrangement 34. This write arrangement draws a picture corresponding to the picture scanned at the transmitter end picture line-sequentially on a record support 32 located on the rotating drum which runs in synchronism with the drum at the transmitter end.

When the receiver cannot reproduce the same number of grey tones or colour components as scanned by the transmitter, the corresponding run lengths, which were efficiently transmitted last are no longer stored in the receive store 20, or on the setting up of the connection the receiver send signals to the transmitter indicating which bit positions can be processed and the transmitter stops the change-over switch 12 at the corresponding binary position and does no longer encode the subsequent binary positions, so that the coding operation and more specifically the transmission of the run length code words of consecutive picture lines is accelerated.

We claim:

1. A method for transmitting at a transmitting end and receiving at a receiving end pictures, said method comprising the steps of at the transmitting end:
   a) scanning a picture to form a plurality of lines each having a plurality of picture element values;
   b) quantizing each of said picture element values so as to represent each of them as a respective binary word having a plurality of bit values occupying a number of binary positions within said binary word;
   c) separating selected bit values having equal binary positions in a group of binary words representing a group of picture element values; and
   d) coding said selected bit values into a plurality of code words using a run length code; and
   at the receiving end, decoding said code words to provide said selected bit values of said respective binary positions of said respective binary words of said group of picture element values.

2. A method as claimed in claim 1, characterized in that the picture element values are represented as binary words of an at least partially hierarchic binary code, in which the most significant bit indicates whether a respective picture element value is located in the upper or in the lower range of a respective value scale.

3. A method as claimed in claim 2, characterized in that in said hierarchic binary code successive picture element values differ by one binary position.

4. A method as claimed in claim 3, characterized in that different run length codes are used for the coding of different binary positions.

5. A method as claimed in claim 1, characterized in that different run length codes are used for the coding of seclected bit values different binary positions.

6. A method as claimed in claim 5, characterized in that for coding the different binary positions a class of run length codes is used whose parameters are changed in dependence on the coded binary position.

7. A method as claimed in claim 1, characterized in that a number of identification bits are inserted after the run length coding of the selected bit values of each binary position.

8. A method as claimed in claim 7, characterized in that the number of identification bits depends on each respective binary position and the content of a portion of the identification bits.

9. A method as claimed in claim 7, characterized in that each of the identidication bits contain information about the location of its respectivce binary position.

10. A method as claimed in claim 7, characterized in that each the identification bits contain information about the run length code used for its respective binary position.

11. A method as claim in claim 7, characterized in that each of said identification bits contain information about at least the number, shortened by cyclic counting, of picture element values in said group.

12. A method as claimed in claim 1, characterized in that each of said identification bits contain information about at least the number, shortened by cyclic counting, of picture element values in said group.

13. A method as claimed in claim 1, characterized in that the bit values having binary positions of equal significance for a plurality of consecutive lines are coded by a two-dimensional run length code.

14. A method as claimed in claim 1 comprising the further step of inserting an end of group character after the run length coding of said selected bit values of said group.

15. A method as claimed in claim 1 comprising the further step of inserting a number of identification bits at least after the run length coding of said selected bit values of said group.

16. A method as described in claim 1 wherein said picture element values comprise a plurality of chrominance values, said method comprising the further step of separating said chrominance values.

17. The method as described in claim 16 wherein said chrominance values are coded as separate binary words.

18. A method as claimed in claim 17, characterized in that for the transmission of the chrominance values these values are encoded using a lower number of quantizing steps.

19. A method as described in claim 1 wherein said picture element values comprise luminance values and chrominance values, said method comprising the further step of separating said luminance and chrominance values.

20. A method as claimed in claim 19, characterized in that consecutive picture element values are compared with each other so as to obtain a plurality of differences and are represented by a constant value as long as the differences stay below a predetermined threshold value.

21. A method as claimed in claim 20, characterized in that in addition to the constant value an information value related to a first number of picture elements having this constant value and a second number of picture element values having a value which differs by the threshold value is determined and transmitted, and that a statistic spatial mixture of first and second picture element values is produced at the receiver end from this composite information for reproduction as a pseudo intermediate value.

22. A method as claimed in claim 20, characterized in that the binary words are each extended by at least one additional bit, which indicates the deviation of respective picture element values from the constant value, the additional bits of the binary words of said group being transmitted without having been coded.

23. A method as claimed in claim 22, characterized in that the bit values having binary positions of equal significance for a plurality of consecutive lines are coded by a two-dimensional run length code.

24. A method as claimed in claim 19, characterized in that the consecutive picture element values are compared with each other so as to obtain a plurality of differences and are represented by a constant value as long as the differences stay below a predetermined threshold value.

25. The method as described in claim 19 wherein said luminance and chrominance values are coded as separate binary words.

26. A method as described in claim 1 further comprising the step of preprocessing said picture element values prior to said quantizing step so as to compensate for irrevelant spatial fluctuations between said picture element values.

27. A method as described in claim 26 wherein in said scanning step said picture element values comprise a luminance value for each of said respective picture element values plus second luminance value related to the immediate environment of said respective picture element value.

28. A system for transmitting and receiving pictures comprising a transmitter and a receiver, wherein said transmitter comprises:
 a) means for scanning a picture to form a plurality of lines, each having a plurality of picture element values;
 b) means for quantizing each of said picture element values so as to represent each of them as a respective binary word having a plurality of bit values occupying a number of binary positions within said binary word;
 c) means for separating selected bit values having equal binary positions within a group of binary words representing a group picture element values;
 d) means for coding said selected bit values into a plurality of code words using a variable length code; and said receiver comprises:
 e) means for decoding said code words; and
 f) means for providing a picture from said code words.

29. The system as claimed in claim 28 wherein said transmitter further comprises:
 a) a transmitter store for sequentially recording the binary words of at least one line;
 b) means for sequentially reading at least one binary position of each of said binary words of said line and for applying the bit values of said binary positions to said encoding means; and wherein said receiver further comprises:
 c) a receiver store; and
 d) a receiver control arrangement for recording a plurality of bit sequences produced by said decoding means into said received store.

30. A system as claimed in claim 29, characterized in that the store has a plurality of levels.

31. A system as claimed in claim 29 wherein said encoding means converts said selected bit values into said code word and stores them in said transmit store; and
 wherein said receiver control means sequentially stores sequences of received code words in said receiver store and reads them in parallel and applies them to said decoding means.

* * * * *